United States Patent Office 3,468,749
Patented Sept. 23, 1969

3,468,749
LAMINATED GLAZING UNIT AND METHOD FOR PRODUCING SAME
Paul T. Mattimoe, Toledo, and William L. Elton, Maumee, Ohio, assignors to Libbey-Owens-Ford Company, a corporation of Ohio
No Drawing. Filed Apr. 25, 1966, Ser. No. 544,690
Int. Cl. B32b 17/06
U.S. Cl. 161—165                                    12 Claims

ABSTRACT OF THE DISCLOSURE

An interlayer material comprising the following ingredients in the indicated proportions: 100 grams of polyvinyl butyral, 30 to 50 grams of a plasticizer for the polyvinyl butyral, and 0.1 to 5 gram milliequivalents of a compound selected from the group consisting of potassium acid maleate, potassium acid citraconate, potassium acid malate, potassium acid malonate, potassium acid phthalate, potassium dihydrogen citrate and mixtures thereof, and two sheets of glass bonded together through said interlayer material.

---

This invention relates generally to improvements in laminated glazing units, and more particularly, is concerned with a novel interlayer composition for use in the production of laminated safety glass and to its method of manufacture.

Laminated safety glass, as employed in the windshields of modern automobiles, is comprised of two sheets of glass integrally bonded together through an interposed layer of plastic. Almost universally the plastic interlayer material employed is polyvinyl butyral. Polyvinyl butyral is an elastomeric material which can absorb the energy of an impacting object by undergoing elongation to a degree which is dependent to a considerable extent on the adhesive forces acting between such polyvinyl butyral and the glass. If the adhesion of a plastic interlayer to the glass is maintained at a high level, then the ability of the interlayer to elongate and absorb the energy of an impacting object will be reduced with a consequent decrease in resistance to penetration. On the other hand, if little or no adhesion exists between the interlayer and the glass, then resistance to penetration will be near a maximum. However, as will be readily appreciated, the condition of little or no adhesion cannot be tolerated in automotive safety glass because of the danger to occupants from pieces of flying glass which could become detached from the interlayer when the laminate is broken.

Thus, in laminated glass for automobile windshields there is an optimum level of glass to interlayer adhesion. At this optimum of level of adhesion, the interlayer would be permitted to elongate sufficiently to provide good resistance to penetration by blunt objects, such as the human head, while at he same time sufficient adhesion would exist to prevent the detachment of glass particles of any appreciable size.

Up to very recently, the methods available for adjusting or controlling the adhesion of polyvinyl butyral to glass all suffered from serious disadvantages. For example, it had been proposed to accomplish this end by regulating the moisture content of the vinyl butyral interlayer. It has long been known that vinyl butyral plastic of the type used in laminated glass shows a decreased adhesion to glass at higher moisture contents. This plastic can absorb up to 4 to 5 percent water. However, it is ordinarily laminated at a moisture content of between 0.2 and 0.8 percent. By exposing the plastic to high humidities, its moisture content can be increased and it has accordingly been proposed to adjust the moisture content to about 1 percent before laminating as a means of establishing a reduced level of adhesion at which the interlayer will be able to elongate appreciably on impact but not so low that glass particles of a substantial size will become detached.

However, this high moisture approach is difficult to follow in large scale commercial manufacture of windshields because it requires that the laminating operations be carried out under conditions of very high humidity, otherwise the plastic will lose moisture to the surrounding atmosphere during assembly of the windshield. Moreover, laminated glass made with a high moisture content interlayer has been found to be less stable to heat and less durable to weather exposure than laminated glass having an interlayer of lower moisture content. Still further, the control over adhesion obtained by laminating with high moisture content interlayers is not consistently reproducible. Apparently, different lots of the interlayer material react differently to high moisture content with a resulting variable effect on adhesion.

It has now been discovered, and the instant invention is based upon such discovery, that the adhesion of glass to a vinyl butyral plastic can be controlled reproducibly throughout the normal range of interlayer moisture content presently used in the safety glass industry by the addition to the vinyl butyral resin compositions of certain monopotassium salts of polycarboxylic acids. This discovery has enabled the production of novel laminated glazing units possessing an optimum level of glass to interlayer adhesion.

It is, therefore, a principal object of the present invention to provide an improved laminated glazing unit.

Another object of the invention is the provision of a novel vinyl butyral interlayer for use in the manufacture of laminated safety glass.

It is another object of the invention to provide a novel method for treating a vinyl butyral resin to improve its adaptability for use as an interlayer material.

It is a further object of the invention to provide a vinyl butyral plastic sheeting which, when employed as the interlayer material in a laminated glass unit, imparts thereto a greatly improved combination of glass adhesion and resistance to impact penetration properties.

Another object of the invention is the provision of a method of treating polyvinyl butyral resins to control the adhesion thereof to glass without simultaneously sacrificing other desirable properties of the resins.

It is a still further object of the invention to provide a method of the above character wherein the control over the adhesive property of the resins is reproducible.

Other objects and advantages of the invention will in part be apparent and will in part appear hereinafter.

For a better understanding of the nature and objects of the invention, reference should be had to the following detailed description which is intended to illustrate and disclose but in no way limit, the invention.

In accordance with one aspect of the invention, a process of treating polyvinyl butyral resins to improve their over-all adaptability for use in laminated glazing units is provided. Such process briefly comprises admixing a monopotassium salt of a polycarboxylic acid selected from the group consisting of maleic acid, citraconic acid, malic acid, malonic acid, citric acid and phthalic acid with a polyvinyl butyral resin in the proportion of from 0.1 to 5 gram milliequivaents of salt per 100 grams of resin. The addition of a compound of the above-recited type to a polyvinyl butyral resin composition has been found to reduce to a moderate extent the adhesion to glass of the interlayer formed therefrom while substantially increasing the resistance to penetration of laminates produced with such interlayer. Also, and most importantly, this improved combination of properties may be easily reproduced on a production basis by following the teachings of the present invention, minor differences in the properties and/or composition of the resin to be treated notwithstanding.

The polyvinyl butyral resins to be treated in accordance with the present invention may be formed either by (1) producing polyvinyl alcohol from polyvinyl acetate through the action of an acid or alkaline catalyst and then converting by reaction with butyraldehyde to an acetal through the action of an acid catalyst, or (2) conducting the reactions in a single stage with an acid catalyst, both as are well known in the art. These polyvinyl butyral resins generally contain about 16 to 25 percent hydroxly groups by weight, calculated as polyvinyl alcohol, less than 3 percent acetate groups, calculated as polyvinyl acetate, and the balance, about 72 to 84 percent by weight polyvinyl butyral.

In addition, the polyvinyl butyral resins treated in accordance with the invention may also have been neutralized. In this connection, the residual acid catalyst in the resin-forming solution is neutralized by the addition thereto of a suitable alkali or alkaline salt. The quantity of the alkaline salt is generally slightly in excess of that required to neutralize the mineral acid catalyst with the resulting resin having an alkalinity or alkaline titer of from about 10 to 30. These neutralized resins, it may be added, are those which until only very recently were substantially universally commercially employed in the production of safety glass interlayers.

Now, in accordance with the present invention, the above-described polyvinyl butyral resins are compounded with potassium acid maleate, potassium acid citraconate, potassium acid malate, potassium acid malonate, potassium dihydrogen citrate, potassium acid phthalate or mixtures of these salts in the proportion of 0.1 to 5 gram milliequivalents of such salt or mixtures per 100 grams of polyvinyl butyral resin. Most generally in preparing the admixture, the potassium salt is put in solution in a known concentration and this solution then added to the polyvinyl butyral resin flake. In this respect, the above salts are all soluble in water, whereby aqueous solutions thereof are preferred and almost always employed. The dissolving and compounding steps may be suitably carried out at room temperature.

The preferred range of milliequivalents of adhesion controlling compound in accordance with the invention per 100 grams of polyvinyl butyral resin is dependent to some extent upon the compound itself. Thus, it has been found that with certain of the compounds a relatively small amount, e.g., 0.1 milliequivalent to 0.5 milliequivalent per 100 grams of resin, is all that is necessary to produce the desired controlled adhesion, and in some instances greater amounts tend to reduce the adhesion below a preferred level. For example, the addition of 0.1 to 0.2 milliequivalent of potassium acid phthalate per 100 grams of resin results in a particularly excellent controlled adhesion interlayer material. Similarly, the addition of 0.1 to 0.3 milliequivalent of potassium acid citraconate results in an effective controlled adhesion interlayer material.

On the other hand, certain of the adhesion controlling compounds in accordance with the invention produced their most desirable effect on the adhesive properties of the polyvinyl butyral resin when present in intermediate amounts with regard to the general range, e.g., 0.5 to 2 milliequivalents thereof per 100 grams of resin. In this connection, particularly excellent results have been obtained with (1) the addition of 0.7 to 1.8 milliequivalents of potassium acid malonate or potassium acid maleate per 100 grams of resin, and (2) the addition of 0.5 to 1.6 milliequivalents of potassium dihydrogen citrate per 100 grams of resin. Potassium acid malate presents still another preferred range in that it provides the controlled adhesion desired when present in relatively large amounts, i.e., up to 5 milliequivalents per 100 grams of resin.

Either before or after admixing a compound in accordance with the invention with the polyvinyl butyral resin, such resin is normally compounded with a suitable plasticizer. Generally, to be effective in laminated glass over a wide variety of weather conditions, the resins are plasticized with from 30 to 50 parts by weight of plasticizer per 100 parts by weight of resin. The plasticizers most generally used in the laminated glass industry are dibutyl sebacate, triethylene glycol di-2-ethylbutyrate and dibutyl Cellosolve adipate. Other ester plasticizers may be used where special affects are desired. After thorough homogenization of the resin, plasticizer and additive compound in accordance with the invention, the admixture is formed into a sheet of predetermined thickness to fashion a laminate of the strength desired. In this connection, interlayer thicknesses of 0.015 inch to 0.030 inch, along with ⅛ inch thick glass sheets, have been found to provide excellent automobile windshield structures. Thereafter, the resin sheets are assembled with glass sheets and laminated under heat and pressure to produce the finished glazing unit.

The following examples are given in illustration and are not intended as limitations on the scope of this invention. Where parts and percents are mentioned, they are parts and percents by weight unless otherwise indicated.

EXAMPLE I

A polyvinyl butyral resin manufactured by condensing butyraldehyde with polyvinyl alcohol in the presence of a mineral acid catalyst was prepared. As previously mentioned, the technique of manufacturing resins of this type is well know to those skilled in the art whereby it is not believed necessary to describe this process here in detail. Suffice to say that the polyvinyl butyral resin was the product of such a condensation reaction carried out under conditions of time, temperature and concentration of reactants to yield a product having a chemical composition comprised of 75 percent to 82 percent of condensed butyralidehyde groups and 18 percent to 25 percent polyvinyl alcohol groups in the resin chain. The residual acid catalyst in the resin-forming solution was neutralized with an alkaline material as is also well known in the art.

To produce an interlayer sheeting having a controlled adhesion in accordance with the invention, the neutralized polyvinyl butyral resin described above was milled on a rubber-type malaxating mill with 3GH plasticizer (triethylene glycol di-2-ethylbutyrate) and potassium acid phthalate as the adhesion controlling agent. The formulation was made up of the above ingredients in the following proportions: 100 grams of resin, 43 grams of 3GH and 0.0204 gram or 0.1 milliequivalent of potassium acid phthalate. This admixture was then sheeted on a mill to a thickness of 0.015 inch.

The resulting polyvinyl butyral sheet was laminated with two outer plies of ⅛ inch thick plate glass 12 inches by 12 inches in size using the standard oil autoclave cycle for automobile safety glass. This laminate was clear, colorless and heat stable. The adhesion of the glass to the plastic interlayer was tested by subjecting it to the hammer crush test which is a conventional test for adhesion throughout the laminated glass industry. This test generally comprises subjecting a laminate to a temperature of zero degree F. for about one hour. The thus conditioned laminate is then held against a heavy metal plate and hammered until the glass is completely pulverized with no flat glass surface remaining. Loose glass particles are removed by shaking the lamination and the laminates are then inspected and graded.

The adhesion is graded on an arbitrary scale of "good +" to "no bond" corresponding to the amount of bare plastic seen after the crush test. The following table sets forth the arbitrary scale against the corresponding percent of approximate area of exposed interlayer.

Table I

| Grading: | Percent exposed interlayer |
|---|---|
| Good + | 1 or less |
| Good | 1 to 5 |
| Good — | 5 to 10 |
| Fair to good | 10 to 30 |
| Fair | 30 to 50 |
| Poor to fair | 50 to 70 |
| Poor | 70 to 95 |
| No bond | 95 to 100 |

The adhesion of the glass to the plastic interlayer above described and produced in accordance with the invention as rated by this test was "good —."

For purposes of comparison, a control laminate identical in construction to that described above except that no adhesion controlling agent was added to the plasticized polyvinyl butyral resin composition employed therein as the interlayer was subjected to the same hammer crush test at zero degree F. The adhesion of the control as determined by this test was rated "good +."

It should be noted that the range of adhesion as determined by the hammer crush test found to produce the desired results in accordance with the invention is generally from "good —" to "poor to fair", with the preferred range being from "fair" to "good —." Up to very recently, it was considered of the utmost importance that laminates for use in automotive vehicles possess an adhesion of "good +."

EXAMPLE II

A neutralized polyvinyl butyral resin having the same composition as that described in Example I was compounded with 3GH plasticizer and potassium acid citraconate in the folowing proportions: 100 grams of resin, 43 grams of 3GH and 0.0168 gram or 0.1 milliequivalent of potassium acid citraconate. The resulting mass was then formed into a plastic sheet and this sheet laminated with two outer plies of ⅛ inch thick plate glass 12 inches by 12 inches in size using the standard oil autoclave cycle for automobile safety glass to produce a clear, colorless sandwich.

The above laminate was then tested for adhesion of the plastic interlayer to the glass sheets by subjecting it to the hammer crush test at zero degree F. The adhesion of the laminate including the interlayer having 0.1 milliequivalent of potassium acid citraconate in its composition was "good—."

Control laminates made at the same time as that described above and of identical construction therewith except that no potassium acid citraconate was employed in the resin composition possessed a "good +" rating when subjected to the hammer crush test.

EXAMPLE III

A neutralized polyvinyl butyral resin having the same composition as that described in Example I was compounded with 3GH plasticizer and potassium acid malonate in the proportion of 100 grams of resin, 43 grams of 3GH and 0.249 gram or 1.75 milliequivalents of potassium acid malonate. This interlayer material was then formed into a sheet and laminated with two outer plies of ⅛ inch thick plate glass. The resulting laminate was clear, colorless and heat stable. The adhesion of the glass to the plastic interlayer as rated by the hammer crush test at zero degree F. was "fair to good."

EXAMPLE IV to XV

A series of laminates including two outer plies of ⅛ inch thick plate glass and an interlayer having a composition as set forth in the following Table II were constructed. All of the laminates were colorless and heat stable. The results of the hammer crush test at zero degree F. for each of the laminates are also set forth in Table II.

TABLE II

| Laminate No. | Interlayer composition of laminate (proportions of ingredients) | Adhesion of interlayer as rated by the hammer crush test at 0° F. |
|---|---|---|
| 1 | 100 grams of polyvinyl butyral resin;[1] 43 grams of 3GH plasticizer; 0.107 grams (.75 milliequivalents) of potassium acid malonate. | Good—. |
| 2 | 100 grams of polyvinyl butyral resin; 43 grams of 3GH plasticizer; 0.129 grams (.75 milliequivalents) of potassium acid malate. | Do. |
| 3 | 100 grams of polyvinyl butyral resin; 43 grams of 3GH plasticizer; 0.173 grams (.75 milliequivalents) of potassium dihydrogen citrate. | Fair to good. |
| 4 | 100 grams of polyvinyl butyral resin; 43 grams of 3GH plasticizer; 0.688 grams (4 milliequivalents) of potassium acid malate. | Do. |
| 5 | 100 grams of polyvinyl butyral resin; 43 grams of 3GH plasticizer; 0.270 grams (1.75 milliequivalents) of potassium acid maleate. | Do. |
| 6 | 100 grams of polyvinyl butyral resin; 43 grams of 3GH plasticizer; 0.301 grams (1.75 milliequivalents) of potassium acid malate. | Do. |
| 7 | 100 grams of polyvinyl butyral resin; 43 grams of 3GH plasticizer; 0.403 grams (1.75 milliequivalents) of potassium dihydrogen citrate. | Fair. |
| 8 | 100 grams of polyvinyl butyral resin; 43 grams of 3GH plasticizer; 0.0306 grams (.15 milliequivalents) of potassium acid phthalate. | Good—. |
| 9 | 100 grams of polyvinyl butyral resin; 43 grams of 3GH plasticizer; 0.8605 grams (5 milliequivalents) of potassium acid malate. | Fair to good. |
| 10 | 100 grams of polyvinyl butyral resin; 43 grams of 3GH plasticizer; 0.116 grams (.75 milliequivalents) of potassium acid maleate. | Do. |
| 11 | 100 grams of polyvinyl butyral resin; 43 grams of 3GH plasticizer; 0.294 grams (1.75 milliequivalents) of potassium acid citraconate. | Fair to poor. |
| 12 | 100 grams of polyvinyl butyral resin; 43 grams of 3GH plasticizer; 0.430 grams (2.5 milliequivalents) of potassium acid malate. | Fair to good. |

[1] All of the polyvinyl butyral resins employed in the compositions of this table have essentially the same composition as that described in Example I.

We claim:

1. A composition of matter, comprising the following ingredients in the indicated proportions: 100 grams of polyvinyl butyral, 30 to 50 grams of a plasticizer for said polyvinyl butyral, and 0.1 to 5 gram milliequivalents of a compound selected from the group consisting of potassium acid maleate, potassium acid citraconate, potassium acid malate, potassium acid malonate, potassium acid phthalate, potassium dihydrogen citrate and mixtures thereof.

2. A laminated glass unit, comprising two sheets of glass bonded together through an interposed transparent sheet of thermoplastic material comprising the following ingredients in the indicated proportions: 100 grams of polyvinyl butyral, 30 to 50 grams of a plasticizer for said polyvinyl butyral, and 0.1 to 5 gram milliequivalents of a compound selected from the group consisting of potassium acid maleate, potassium acid citraconate, potassium acid malate, potassium acid malonate, potassium acid phthalate, potassium dihydrogen citrate and mixtures thereof.

3. A laminated glass unit as defined in claim 2, wherein said transparent sheet of thermoplastic material is approximately 0.030 inch thick.

4. A laminated glass unit as defined in claim 2, wherein said compound is potassium acid phthalate and said thermoplastic material includes 0.1 to 0.5 gram milliequivalent of potassium acid phthalate per 100 grams of polyvinyl butyral.

5. A laminated glass unit as defined in claim 4, wherein said thermoplastic material includes 0.1 to 0.2 gram milliequivalent of potassium acid phthalate per 100 grams of polyvinyl butyral.

6. A laminated glass unit as defined in claim 2, wherein said compound is potassium acid citraconate and said thermoplastic material includes 0.1 to 0.5 gram milliequivalent of potassium acid citraconate per 100 grams of polyvinyl butyral.

7. A laminated glass unit as defined in claim 2, wherein said compound is potassium acid maleate and said thermoplastic material includes 0.5 to 2 gram milliequivalents of potassium acid maleate per 100 grams of polyvinyl butyral.

8. A laminated glass unit as defined in claim 2, wherein said compound is potassium acid malonate and said thermoplastic material includes 0.5 to 2 gram milliequivalents of potassium acid malonate per 100 grams of polyvinyl butyral.

9. A laminated glass unit as defined in claim 2, wherein said compound is potassium dihydrogen citrate and said thermoplastic material includes 0.5 to 2 gram milliequivalents of potassium dihydrogen citrate per 100 grams of polyvinyl butyral.

10. A laminated glass unit as defined in claim 2, wherein said compound is potassium acid malate and said thermoplastic material includes 0.75 to 5 gram milliequivalents of potassium acid malate per 100 grams of polyvinyl butyral.

11. An interlayer for use in the manufacture of laminated glazing units, comprising a sheet of thermoplastic material consisting essentially of the following ingredients in the indicated proportions: 100 grams of polyvinyl butyral, 30 to 50 grams of a plasticizer for said polyvinyl butyral, and 0.1 to 5 gram milliequivalents of a compound selected from the group consisting of potassium acid maleate, potassium acid citraconate, potassium acid malate, potassium acid malonate, potassium acid phthalate, potassium dihydrogen citrate and mixtures thereof.

12. An automobile windshield, comprising two sheets of glass, each having a thickness of approximately ⅛ inch bonded together by an interposed transparent layer of thermoplastic material approximately 0.030 inch thick and comprising the following ingredients in the indicated proportions: 100 grams of polyvinyl butyral, 30 to 50 grams of a plasticizer, and 0.1 to 5 gram milliequivalents of a compound selected from the group consisting of potassium acid maleate, potassium acid citraconate, potassium acid malate, potassium acid malonate, potassium acid phthalate, potassium dihydrogen citrate and mixtures thereof.

References Cited

UNITED STATES PATENTS

| 2,496,480 | 2/1950 | Lavin et al. | 260—73 |
| 3,231,461 | 1/1966 | Mattimoe | 161—199 |
| 3,262,836 | 7/1966 | Lavin et al. | 161—199 |

ROBERT F. BURNETT, Primary Examiner

WILLIAM J. VAN BALEN, Assistant Examiner

U.S. Cl. X.R.

156—106; 161—199; 260—73